United States Patent [19]

Sawyer

[11] 4,276,201

[45] Jun. 30, 1981

[54] CATALYST AND HYDROCONVERSION PROCESS UTILIZING THE SAME

[75] Inventor: Willard H. Sawyer, Baton Rouge, La.

[73] Assignee: Exxon Research & Engineering Co., Florham Park, N.J.

[21] Appl. No.: 155,206

[22] Filed: Jun. 2, 1980

Related U.S. Application Data

[63] Continuation-in-part of Ser. No. 66,572, Aug. 15, 1979, abandoned.

[51] Int. Cl.$^3$ .......................... B01J 21/12; B01J 23/76
[52] U.S. Cl. ............................... 252/455 R; 252/463; 423/628
[58] Field of Search ........................... 252/455 R, 463; 423/628

[56] References Cited

U.S. PATENT DOCUMENTS 4,159,969  7/1979  Moné et al. ........................... 252/463
4,175,118  11/1979  Wassermann et al. ............... 423/628

*Primary Examiner*—Carl F. Dees
*Attorney, Agent, or Firm*—Marthe L. Gibbons

[57] ABSTRACT

A catalyst is provided which comprises a hydrogenation component and a support comprising agglomerates of alumina having initially not more than 0.20 cubic centimeters per gram of its pore volume in pores greater than about 400 Angstroms in diameter and a minor amount of silica. A process for the hydroconversion of hydrocarbonaceous oils utilizing the catalyst is also provided.

9 Claims, No Drawings

2

CATALYST AND HYDROCONVERSION PROCESS UTILIZING THE SAME

CROSS REFERENCE TO RELATED APPLICATIONS

This application is a continuation-in-part of U.S. patent application Ser. No. 066,572 filed Aug. 15, 1979 and now abandoned, the teachings of which are hereby incorporated by reference.

BACKGROUND OF THE INVENTION

1. Field of the Invention

This invention relates to a catalyst and a process for the hydroconversion of hydrocarbonaceous oils.

2. Description of the Prior Art

Hydroconversion catalysts comprising a hydrogenation component and a support comprising alumina are well known in the art. Hydroconversion processes in which a hydrocarbonaceous oil feed is converted in the presence of hydrogen and a catalyst comprising a hydrogenation component and a support comprising alumina are known.

The term "hydroconversion" is used herein to denote a process conducted in the presence of hydrogen in which at least a portion of the heavy constituents of the hydrocarbonaceous oil chargestock is converted to lower boiling hydrocarbon products while, simultaneously reducing the concentration of nitrogenous compounds, sulfur compounds and metallic contaminants.

A method of preparing agglomerates of alumina is disclosed in Akzona's U.S. Pat. No. 4,159,969, based on Dutch patent application No. 7700810 published July 31, 1978, the teachings of which are hereby incorporated by reference. The Akzona patent also discloses that the agglomerates of alumina may be composited with catalytically active materials in conventional ways. It has now been found that a catalyst comprising such agglomerates of alumina having a specified macroporosity will provide advantages that will become apparent in the ensuing description.

SUMMARY OF THE INVENTION

In accordance with the invention there is provided, a catalyst comprising:

(a) a support having initially a surface area ranging from about 350 to about 500 $m^2/g$, a total pore volume of about 1.0 to about 2.5 cc/g, not more than about 0.2 cc/g of said pore volume being in pores having a diameter of more than about 400 Angstroms, said support comprising agglomerates of alumina and silica, said silica comprising less than about 10 weight percent of said support, said agglomerates having been prepared in an agglomeration zone, under agglomeration conditions, including maintaining the heat introduced into said agglomeration zone in the range of about 10,000 to about 25,000 British thermal units per hour per pound of said alumina, and (b) a hydrogenation component selected from the group consisting of elemental metal, metal oxide, metal sulfide of a Group VIB metal and an elemental metal, metal oxide and metal sulfide of a Group VIII metal and mixtures thereof of the Periodic Table of Elements.

In accordance with the invention, there is also provided a hydroconversion process utilizing the above-stated catalyst.

DETAILED DESCRIPTION OF THE INVENTION

The Support

A catalyst support comprises agglomerates of alumina and a minor amount of silica. Optionally, minor amounts of other refractory oxides may be included in the support. Agglomerates of alumina, also referred to herein as "beaded" alumina, have initially prior to being composited with the hydrogenation component, a BET surface area ranging from about 350 to about 500 $m^2/g$, a BET total pore volume of about 1.0 to about 2.5 cc/g. The agglomerates of alumina initially used as component of the catalyst must have not more than about 0.20 cc/g of its pore volume in pores having diameter greater than 400 Angstroms (these pores will hereinafter be called macropores). Suitable range of pores having diameter greater than 400 Angstroms include from about 0.05 to 0.20 cc/g. The agglomerates of alumina may be prepared by a modification of the method disclosed in U.S. Pat. No. 4,159,969. According to the teachings of said U.S. patent, alumina agglomerates are prepared by contacting a hydrous aluminum oxide gel with an organic liquid which is essentially immiscible with water at a given ratio of organic liquid to water, as contained in the gel, such that only a portion of the water is removed from the hydrous aluminum oxide gel, prior to drying the gel. After the contacting step, according to the teachings of said U.S. patent, any prior art technique for agglomeration can be used. For example, the gel which has been contacted with the organic liquid may be placed in a rotary film evaporator and the liquid phase evaporated off with continuous agitation. After subjecting the gel to agglomeration conditions and calcination, the alumina agglomerates made in accordance with the teachings of U.S. Pat. No. 4,159,969 will have a surface area ranging from about 350 to about 500 $m^2/g$ (BET) and a pore volume ranging from about 1.0 to about 2.5 cc/g (BET). The alumina agglomerates utilized as component of the catalyst of the present invention must have a low macroporous volume, that is, the MERPOR pore volume in pores greater than 400 Angstroms in diameter must be not more than about 0.2 cc/g and may range from about 0.05 to 0.2 cc/g. The term "MERPOR" is used herein to designate a mercury penetration method using porosimeter model 915-2 manufactured by Micrometritics Corporation, Norcross, Ga. The surface tension of the mercury is taken at a contact angle of 140 degrees. A pressure of 50,000 psig is used unless otherwise specified. The term "BET" is used herein to designate a nitrogen adsorption method of Brunauer, Emmett and Teller as shown in the Journal of American Chemical Society, vol. 16 (1938) pages 309 to 319. It has been found, in accordance with the present invention, that the macroporosity of these alumina agglomerates can be controlled by controlling the rate of heat input into the agglomeration zone during the vaporization of the liquid phase (that is, the alcohol-water azeotrope) from the gel during the formation of the agglomerates to obtain the desired macroporosity. When catalytic metals are included during the formation of the agglomerates, that is, prior to calcination, the calcined catalyst should have a macroporosity of not more than about 0.2 cc/g. In the embodiment in which a calcined agglomerate support is subsequently impregnated with the catalytic metals, the calcined support as well as the finished catalyst should have a macroporosity of not more than about 0.2 cc/g (MERPOR). One method of obtaining a macroporosity of less than about 0.2 cc/g in accordance with the present invention, is to control the heat introduced into the agglomeration zone during the vaporization of the azeotrope from the gel during the agglomeration of the alumina support to a range of about 10,000 to about 25,000 BTU per hour per pound of alumina. When the catalytic metal components are not present during the formation of the agglomerates, a preferred range is from about 10,000 to 20,000 BTU per hour per pound of alumina, more preferably from about 13,000 to 15,000 BTU per hour per pound of alumina. When catalytic metal components are included during the formation of the agglomerates prior to calcination, a preferred range of heat input for the vaporization of the liquid phase (azeotrope) from the gel is from about 20,000 to about 25,000 BTU per hour per pound of alumina.

The catalyst support of the present invention additionally comprises a minor amount of silica, that is, less than about 10 weight percent, based on the weight of the support, preferably from about 1 to about 6 weight ercent silica, more preferably from about 1 to about 4 weight percent silica, based on the support. As disclosed in U.S. Pat. No. 4,159,969, sodium silicate may be added to the alumina hydrogel prior to gelation to yield silica in the final catalyst. Furthermore, minor amounts of boron oxide, phosphorous pentoxide, titanium oxide, zirconium oxide, etc. may also be present in the alumina agglomerate-containing support.

The Hydrogenation Component

Suitable hydrogenation component include elemental metal, metal oxide, and metal sulfide of the Group VIB metal, and elemental metal, metal oxide and metal sulfide of the Group VIII metal and mixtures thereof of the Periodic Table of Elements. The Periodic Table referred to herein is in accordance with *Handbook of Chemistry and Physics* published by Chemical Rubber Company, Cleveland, Ohio, 45th Edition, 1964. The preferred Group VIB metal component in the final catalyst is selected from the group consisting of molybdenum oxide, molybdenum sulfide, tungsten oxide, tungsten sulfide and mixtures thereof. The preferred Group VIII metal component is selected from the group consisting of nickel oxide, nickel sulfide, cobalt sulfide, cobalt oxide and mixtures thereof. The Group VIII metal component is suitably present in the final catalyst in amounts ranging from about 1 to about 6 weight percent, calculated as the oxide, based on the total catalyst. The Group VIB metal component is suitably present in the final catalyst in amounts ranging from about 5 to about 25 weight percent, preferably from about 12 to about 18 weight percent, calculated as the oxide, based on the total catalyst.

The hydrogenation components may be composited with the support in any suitable manner and at any stage of the preparation of the catalyst. For example, salts of the desired metals may be used to impregnate the agglomerates. The impregnation may be performed before, during or after formation of the agglomerates, prior to calcination. Alternatively, the impregnation can be performed after calcination of the agglomerates.

The finished catalyst, after calcination, will have a BET surface area ranging from about 250 to about 450 m²/g; a BET pore volume ranging from about 0.9 to about 2.0 cc/g and a macroporosity (pores having diameter greater than 400 Angstroms) of about 0.05 to about 0.2 cc/g; as measured by MERPOR.

The catalyst may be sulfided prior or during use in a conventional way as is well known in the art.

The catalyst of the invention is suitable for hydrocarbon hydroprocessing such as hydrodesulfurization, hydroconversion, hydrodenitrogenation, etc. It is particularly suited for hydroconversion of heavy hydrocarbonaceous oils.

Hydroconversion Conditions

Suitable hydroconversion conditions, when utilizing the catalyst of the present invention, include a temperature ranging from about 600° to about 950° F., a pressure ranging from about 500 to about 5000 psig. Preferred hydroconversion conditions include a temperature ranging from about 700° F. to about 900° F., more preferably from about 750° F. to about 850° F., a pressure ranging from about 1000 to 4000 psig, more preferably from about 2000 to about 3000 psig and a hydrogen rate of 1000 to 10,000 standard cubic feet of hydrogen per barrel of oil feed, preferably 4000 to 6000 standard cubic feet of hydrogen per barrel of oil feed.

The process may be carried out in a fixed bed, moving bed, ebullating bed, slurry, disperse phase or fluidized bed operation. Preferably, the process is carried out in an ebullating bed. Suitable oil feed space velocity for ebullating bed operation include 0.1 to 5 V/Hr/V, preferably 0.3 to 1.0 V/Hr/V.

Heavy Hydrocarbonaceous Chargestock

Suitable chargestocks include heavy hydrocarbonaceous oils boiling above about 650° F. at atmospheric pressure, such as for example, petroleum crude oils, including heavy crude oils; heavy hydrocarbon distillates boiling in the range of about 650° to 1050° F. at atmospheric pressure, such as gas oils; residual petroleum oils, such as atmospheric distillation bottoms and vacuum distillation bottoms; bitumens; tar; tarsand oil; shale oil; liquids derived from coal liquefaction processes, including coal liquefaction bottoms.

The process is particularly well suited for treating residual oils such as atmospheric residuum and vacuum residuum.

PREFERRED EMBODIMENTS

The following examples are presented to illustrate the invention.

EXAMPLE 1

Comparative tests were made utilizing a catalyst of the present invention, herein designated "Catalyst A" and three prior art catalysts designated Catalysts "B", "C" and "D".

Catalyst A was prepared by producing an agglomerated (beaded) alumina support comprising about 2 weight percent silica. The support had the following physical properties:

| | |
|---|---|
| BET surface area | = 434 m²/g |
| BET pore volume | = 1.61 cc/g |
| Average pore diameter | = 148 Angstroms |
| Pore Volume of 400A+ | = 0.12 cc/g |

The above-stated support was impregnated with cobalt and molybdenum to yield 3.3 weight percent CoO and 12.4 weight percent MoO₃ in the catalyst. No substantial change in the physical properties occurred from the impregnation. This catalyst is herein designated "Catalyst A".

The compositions of Catalysts A, B, C and D are given in Table I.

TABLE I

| Catalyst | A | B | C | D |
|---|---|---|---|---|
| $MoO_3$, wt. % | 12.4 | 14.9 | 15.0 | 14.9 |
| CoO, wt. % | 3.3 | 4.5 | 3.5 | 3.1 |
| Alumina, wt. % | 82.8 | 79.8 | 81.5 | 82.0 |
| Silica, wt. % | 0.9 | — | — | — |
| $P_2O_5$, wt. % | 0.6 | 0.8 | — | — |

These catalysts were tested utilizing a light Arabian vacuum residuum feed having 3.6 weight percent sulfur, 60 wppm vanadium, 89 weight percent 1050° F.+ and 0.3 weight percent nitrogen. The conditions used for the comparative tests were a temperature of 780° F., a hydrogen rate of 6000 standard cubic feet of hydrogen per barrel of feed, a pressure of 2400 psig, a space velocity of 0.5 volume of feed per volume of catalyst per hour in an upflow reactor in which the catalyst was disposed in a fixed bed.

The results of these tests are summarized in Table II.

TABLE II

| Conv. @ 780° F. | A | B | C | D |
|---|---|---|---|---|
| 1050° F. +, wt. % | 67-51 | 51-36 | 53-39 | 59-39 |
| Sulfur, wt. % | 96-92 | 91-80 | 93-80 | 95-76 |
| Nitrogen, wt. % | 70-64 | 49-29 | 41-25 | 46-25 |
| Vanadium, wt. % | 91-83 | 100-99 | 100-99 | 100-99 |

In each experiment, the range given for the data is for start-of-run and end-of-run with the run length averaging about 21 to 25 days. As can be seen from the data of Table II, Catalyst A was superior to the standard prior art commercial Catalysts B, C and D for all reactions except for vanadium removal.

EXAMPLE 2

To determine the effect of macroporosity on catalyst activity, two catalysts (Catalysts E and F) prepared using the agglomerate formation method were tested. Catalyst E had a macroporosity of about 0.92 cc/g. The catalytic metals were included during the agglomeration step in making Catalyst E. Catalyst F, which is a catalyst having the macroporosity in accordance with the present invention, was made by first forming the agglomerate (beaded) support followed by impregnation of the calcined support with the catalytic metal components. The composition of both catalysts was 6 weight percent CoO; 20 weight percent $MoO_3$; 1 weight percent $P_2O_5$; 73 weight percent $Al_2O_3$. The physical properties of these catalysts are summarized in Table III.

TABLE III

| | Catalyst E | Catalyst F |
|---|---|---|
| BET surface area, $m^2/g$ | 445 | 319 |
| BET pore volume, cc/g | 2.19 | 1.38 |
| MERPOR 400Å+ pore volume, cc/g | 0.92 | 0.18 |
| Bulk density, g/cc | 0.258 | 0.470 |

Catalysts E and F were tested in a catalyst screening unit consisting of four reactors in a common sandbath. In each case, 10 cc of each catalyst were charged to a reactor and the catalyst was sulfided for 16 hours with 10 vol. % $H_2S$ in $H_2$ at 750° F. The catalysts were tested at 750° F., 1 V/Hr/V (10 cc/hr), 2250 psig and 6000 $SCF/H_2$ for about 3 weeks. The feed used in the test was a Cold Lake crude having 4.3 weight percent sulfur, 165 wppm vanadium and 46 weight percent 1050° F.+ material. After approximately 160 hours on oil, the data shown in Table IV were obtained.

TABLE IV

| Conversion at 750° F. | Catalyst E | Catalyst F |
|---|---|---|
| Sulfur, wt. % | 78 | 89 |
| Vanadium, wt. % | 63 | 78 |
| 1050° F.+, wt. % | 32 | 46 |

As can be seen from the data of Table IV, Catalyst F, which is a catalyst having the required low macroporosity in accordance with the present invention, was superior to Catalyst E which was a catalyst having a greater macroporosity and which is, therefore, not a catalyst of the present invention.

EXAMPLE 3

This example shows that control of the macroporosity of the catalyst support is obtained by controlling the heat input rate into the agglomerate formation zone and, therefore, the rate of vaporization of the alcohol-water azeotrope from the gel during the agglomeration of the alumina support.

To 300 grams of an aluminum oxide gel filter cake having a solids content of 4 weight percent, isoamyl alcohol was added in an amount sufficient to provide a weight ratio of alcohol to water, as contained in the gel, of about 0.88. The mixture was placed in a 1 liter flask which was partially immersed in an oil bath. The flask was attached to a rotary film evaporator. The pressure was 25 cm Hg. The temperature was first maintained at 90° C. for 1.5 hours by the oil bath. The temperature was then increased to 100° C.+ to remove the remainder of the alcohol-water azeotrope. The resulting alumina agglomerates were dried and then calcined at about 538° C. for 4 hours. The resulting catalyst support, is herein designated "support G". The procedure used to prepare "support G" was similar to the procedure disclosed in U.S. Pat. No. 4,159,969, see particularly Example 2.

The procedure used to prepare "support G" was modified as follows to prepare other supports: a three-liter flask was utilized instead of a one-liter flask and the reactants were tripled. These changes inherently reduced the heat input rate into the flask and consequently reduced the vaporization rate. The bath temperature was varied to change the heat input rate to produce different supports. The results are summarized in Table V.

TABLE V

| Catalyst Support | G | H | I | J |
|---|---|---|---|---|
| Flask size | 1 liter | 3 liters | | |
| Bath temperature, °C. | 90 | 90 | 80 | 100 |
| Heat input, BTU/hr per 1 lb $Al_2O_3$ | 28678 | 13746 | 7963 | 19434 |
| SA, $m^2/gm$ | 456 | 401 | 368 | 403 |
| PV, cc/gm | 2.49 | 1.50 | 1.25 | 1.78 |
| PD, Å | 218 | 150 | 136 | 177 |
| 400Å + PV, cc/gm | 0.81 | 0.08 | 0.04 | 0.20 |

SA = surface area
PD = pore diameter
PV = pore volume

The data of Table V show that control of the macroporosity is directly related to the rate of heat supplied to the vessel or zone of formation of the agglomerates. Catalyst supports H, I and J are suitable supports for the catalyst of the present invention since they have not more than about 0.2 cc/g of their pore volume in pores having a diameter of more than about 400 Angstroms.

What is claimed is:

1. A catalyst comprising:
   (a) a support having initially a surface area ranging from about 350 to about 500 $m^2/g$, a total pore volume of about 1.0 to about 2.5 cc/g, not more than about 0.2 cc/g of said pore volume being in pores having a diameter of more than about 400 Angstroms, said support comprising agglomerates of alumina and silica, said silica comprising less than about 10 weight percent of said support, said agglomerates having been prepared in an agglomeration zone, under agglomeration conditions, including maintaining the heat introduced into said agglomeration zone in the range of about 10,000 to about 25,000 British thermal units per hour per pound of said alumina, and
   (b) a hydrogenation component selected from the group consisting of elemental metal, metal oxide, metal sulfide of a Group VIB metal and an elemental metal, metal oxide and metal sulfide of a Group VII metal and mixtures thereof of the Periodic Table of Elements.

2. The catalyst of claim 1, wherein said heat introduced into said agglomeration zone ranges from about 10,000 to about 20,000 British thermal units per hour per pound of said alumina.

3. The catalyst of claim 1 wherein said hydrogenation component is present in said agglomeration zone during the preparation of said agglomerates and wherein said heat introduced into said agglomeration zone ranges from about 20,000 to about 25,000 British thermal units per hour per pound of said alumina.

4. The catalyst of claim 1 wherein said pores having diameters above about 400 Angstroms comprise from about 0.05 to about 0.20 cc/g of the pore volume of said catalyst.

5. The catalyst of claim 1 wherein said silica comprises from about 1 to about 6 weight percent of said support.

6. The catalyst of claim 1 wherein said silica comprises from about 1 to about 4 weight percent of said support.

7. The catalyst of claim 1 wherein said catalyst comprises from about 1 to about 6 weight percent of at least one of said Group VIII metals and from about 5 to about 25 weight percent of said Group VIB metals, calculated as the oxides thereof, based on the total catalyst.

8. The catalyst of claim 1 wherein said hydrogenation component is selected from the group consisting of nickel, nickel oxide, nickel sulfide, molybdenum, molybdenum oxide, molybdenum sulfide, tungsten, tungsten oxide, tungsten sulfide, cobalt, cobalt oxide, cobalt sulfide, and mixtures thereof.

9. The catalyst of claim 1 wherein said catalyst has a surface area ranging from about 250 to about 450 $m^2/g$, a pore volume ranging from about 0.9 to about 2.0 cc/g and not more than about 0.2 cc/g of said pore volume being in pores having a diameter of more than about 400 Angstroms.

* * * * *